US010447611B2

(12) United States Patent
Blacka et al.

(10) Patent No.: US 10,447,611 B2
(45) Date of Patent: *Oct. 15, 2019

(54) SYSTEM AND METHOD FOR ADDING A WHITELIST ENTRY VIA DNS

(71) Applicant: VERISIGN, INC., Reston, VA (US)

(72) Inventors: David Blacka, Reston, VA (US); Sean Mountcastle, Herndon, VA (US)

(73) Assignee: VERISIGN, INC., Reston, VA (US)

( * ) Notice: Subject to any disclaimer, the term of this patent is extended or adjusted under 35 U.S.C. 154(b) by 361 days.

This patent is subject to a terminal disclaimer.

(21) Appl. No.: 14/507,266

(22) Filed: Oct. 6, 2014

(65) Prior Publication Data

US 2015/0026341 A1 Jan. 22, 2015

Related U.S. Application Data

(63) Continuation-in-part of application No. 13/546,155, filed on Jul. 11, 2012, now Pat. No. 8,856,305.

(51) Int. Cl.
*G06F 16/955* (2019.01)
*H04L 12/911* (2013.01)
*H04L 29/12* (2006.01)
*H04L 29/06* (2006.01)

(52) U.S. Cl.
CPC ......... *H04L 47/70* (2013.01); *G06F 16/9566* (2019.01); *H04L 61/1511* (2013.01); *H04L 63/101* (2013.01); *H04L 63/168* (2013.01)

(58) Field of Classification Search
CPC . G06F 17/30887; H04L 47/70; H04L 63/168; H04L 63/101; H04L 61/1511
See application file for complete search history.

(56) References Cited

U.S. PATENT DOCUMENTS

| 7,571,325 B1 | 8/2009 | Cooley et al. |
| 7,600,011 B1 | 10/2009 | Urbanek |
| 8,650,245 B1 * | 2/2014 | Ashley ............... H04L 51/12 709/203 |
| 8,869,272 B2 * | 10/2014 | Kumar ............ G06F 21/554 726/22 |
| 2002/0073335 A1 | 6/2002 | Shuster |
| 2006/0031314 A1 * | 2/2006 | Brahms ............... H04L 51/12 709/206 |

(Continued)

OTHER PUBLICATIONS

Ilario Nocentini, Extended European Search Report dated Feb. 2, 2016, European Application No. 15188397.2, pp. 1-7.

(Continued)

*Primary Examiner* — Uzma Alam
(74) *Attorney, Agent, or Firm* — Artegis Law Group, LLP

(57) ABSTRACT

A method for adding a blacklisted site to a whitelist. At least one whitelisting query may be generated for an encoded domain in the tag format: a nonce, a hash, a blocked-domain, and a static domain, each separated by a delimiter. The nonce is a unique identifier for the at least one query. The hash is a cryptographic hash of an IP address of the user, a normalized timestamp, and the blocked domain. The static domain is a constant domain representing the at least one query. The at least one query may be sent to a first recursive DNS server. The first recursive DNS server may create a message including whitelist information. The first recursive DNS server may send the message to a second recursive DNS server.

22 Claims, 17 Drawing Sheets

(56) References Cited

U.S. PATENT DOCUMENTS

| | | | |
|---|---|---|---|
| 2007/0107059 A1* | 5/2007 | Chasin | H04L 63/126 726/23 |
| 2007/0294419 A1 | 12/2007 | Ulevitch | |
| 2008/0028100 A1* | 1/2008 | Adelman | G06Q 10/107 709/245 |
| 2008/0082662 A1* | 4/2008 | Dandliker | H04L 63/10 709/225 |
| 2008/0104186 A1* | 5/2008 | Wieneke | G06Q 10/107 709/206 |
| 2009/0083413 A1 | 3/2009 | Levow et al. | |
| 2010/0049985 A1* | 2/2010 | Levow | H04L 29/12066 713/180 |
| 2010/0146415 A1* | 6/2010 | Lepeska | H04L 29/00 715/760 |
| 2010/0274970 A1 | 10/2010 | Treuhaft et al. | |
| 2011/0119306 A1 | 5/2011 | Patil | |
| 2011/0185429 A1* | 7/2011 | Sallam | G06F 21/562 726/24 |
| 2011/0208850 A1* | 8/2011 | Sheleheda | G06F 16/9535 709/223 |
| 2011/0246634 A1 | 10/2011 | Liu et al. | |
| 2011/0283357 A1* | 11/2011 | Pandrangi | H04L 63/1425 726/22 |
| 2011/0289216 A1 | 11/2011 | Szeto et al. | |
| 2012/0017259 A1 | 1/2012 | MacCarthaigh | |
| 2012/0054869 A1* | 3/2012 | Yen | H04L 29/12066 726/24 |
| 2012/0084423 A1* | 4/2012 | McGleenon | H04L 61/1511 709/223 |
| 2012/0096261 A1 | 4/2012 | Ko et al. | |
| 2012/0110326 A1* | 5/2012 | Rossi | H04L 29/12066 713/162 |
| 2012/0158969 A1 | 6/2012 | Dempsky et al. | |
| 2012/0173684 A1 | 7/2012 | Courtney et al. | |
| 2012/0204243 A1* | 8/2012 | Wynn | H04L 63/0428 726/5 |
| 2012/0324113 A1 | 12/2012 | Prince et al. | |
| 2013/0247183 A1* | 9/2013 | Kumar | G06F 21/554 726/22 |
| 2014/0019601 A1 | 1/2014 | Blacka et al. | |

OTHER PUBLICATIONS

"Edit Blacklists per Domain," Rackspace Email and Exchange Support Site, Jan. 2014.
"DSNBL," Wikipedia, Jan. 2014.
Lewis, "RFC 6471," Jan. 2012.
Stephane Michalski, Extended European Search Report dated Jul. 24, 2015, European application No. 13175817.9, pp. 1-7.

* cited by examiner

SYSTEM AND METHOD FOR ADDING A WHITELIST ENTRY VIA DNS

CROSS-REFERENCE TO RELATED APPLICATIONS

This application is a continuation-in-part of and claims priority to U.S. patent application Ser. No. 13/546,155 filed Jul. 11, 2012, the entire disclosure of which is hereby incorporated by reference in its entirety.

TECHNICAL FIELD

The present disclosure relates to the field of accessing web sites and, more particularly, to systems and method for adding a whitest entry via Domain Name System (DNS).

BACKGROUND

A client computer can use a network, such as the Internet, to communicate with and identify other computers connected to the network. The client computer identifies a unique IP address for each of these other computers. The client computer may know the IP address of a computer, or may need to search for this IP address using the Domain Name System (DNS).

Sometimes there is reason to present a "block page" to a user, such as when the user attempts to browse to a site that is deemed inappropriate (malicious, gambling, porn, time-wasting, etc). Thus, these sites may be blocked, and the user is presented with a block page. However, sometimes the user needs to continue to a blocked site.

Traditional approaches for maintaining "whitelists," which are, for example, lists of authorized IP addresses, require either distributing the whitelist updates through a central point, for example, a central datacenter running a database, or synchronizing the whitelist updates between web servers that handle a "continue to site" button, which may be included on a "block page." Both of these approaches provide slow access for a user.

In the past, in an effort to speed up web browsing, browsers maintained their own DNS caches. However, these DNS caches do not always respect the Time to Live (TTL), which limits the time period an IP address is whitelisted, specified in a specific DNS record. This will cause problems for a user who wishes to continue to the blocked site, because the bad IP address is stuck in a user's browser cache, and the user will not be able to go to a web page corresponding to that bad IP address. In the past, service providers have asked users to explicitly flush the users' browser caches, or, when a user is not able to flush the browser cache, to simply quit and restart the browser. This requires the customer to take these measures themselves, and provides for a burdensome user experience. Thus, there is a need to automatically flush a user's browser cache without burdening the user.

SUMMARY

Consistent with disclosed embodiments, a computer-implemented method, performed by a processor, for automatically adding a blacklisted site to a whitelist in response to a user's request is disclosed. At least one whitelisting query may be generated for an encoded domain in the tag format a nonce, a hash, a blocked-domain, and a static domain, each separated by a delimiter. The nonce is a unique identifier for the at least one query. The hash is a cryptographic hash of an IP address of the user, a normalized timestamp, and the blocked domain. The static domain is a constant domain representing the at least one query. The at least one query may be sent to a first recursive DNS server. The first recursive DNS server may create a message including whitelist information. The first recursive DNS server may send the message to a second recursive DNS server.

Consistent with disclosed embodiments, a system for adding a blacklisted site to a whitelist is disclosed. The system may include a processor and a memory containing executable code, that when executed by the processor, causes the processor to perform a method. The method may include requesting, by a web browser via a network, a blacklisted site. The blacklisted site may have a domain name of the tag format <blocked-domain>. At least one whitelisting query may be generated for an encoded domain in the tag format: a nonce, a hash, a blocked-domain, and a static domain, each separated by a delimiter. The nonce is a unique identifier for the at least one query. The hash is a cryptographic hash of an IP address of the user, a normalized timestamp, and the blocked domain. The static domain is a constant domain representing the at least one query. The at least one query may be sent to a first recursive DNS server. The first recursive DNS server may create a message including whitelist information. The first recursive DNS server may send the message to a second recursive DNS server.

Consistent with disclosed embodiments, a computer-implemented method, performed by a processor, for automatically adding a blacklisted site to a whitelist in response to a user's request is disclosed. The method may include receiving, at a first recursive DNS server, at least one whitelisting query for an encoded domain. The encoded domain may be a sequence in tag format: a nonce, a hash, a blocked-domain, and a static domain, each separated by a delimiter. The nonce is a unique identifier for the at least one whitelisting query. The hash is a cryptographic hash of an IF address of the user, a normalized timestamp, and the blocked domain. The static domain is a constant domain representing the at least one whitelisting query. A message may be created including whitelist information. The message may be sent from the first recursive DNS server to a second server.

It is to be understood that both the foregoing general description and the following detailed description are exemplary and explanatory only and are not restrictive of the invention, as claimed.

The accompanying drawings, which are incorporated in and constitute a part of this specification, illustrate one (several) embodiment(s) of the invention and together with the description, serve to explain the principles of the invention.

DESCRIPTION

Reference will now be made in detail to the disclosed embodiments of the invention, examples of which are illustrated in the accompanying drawings. Wherever possible, the same reference numbers will be used throughout the drawings to refer to the same or like parts.

Figure 1:
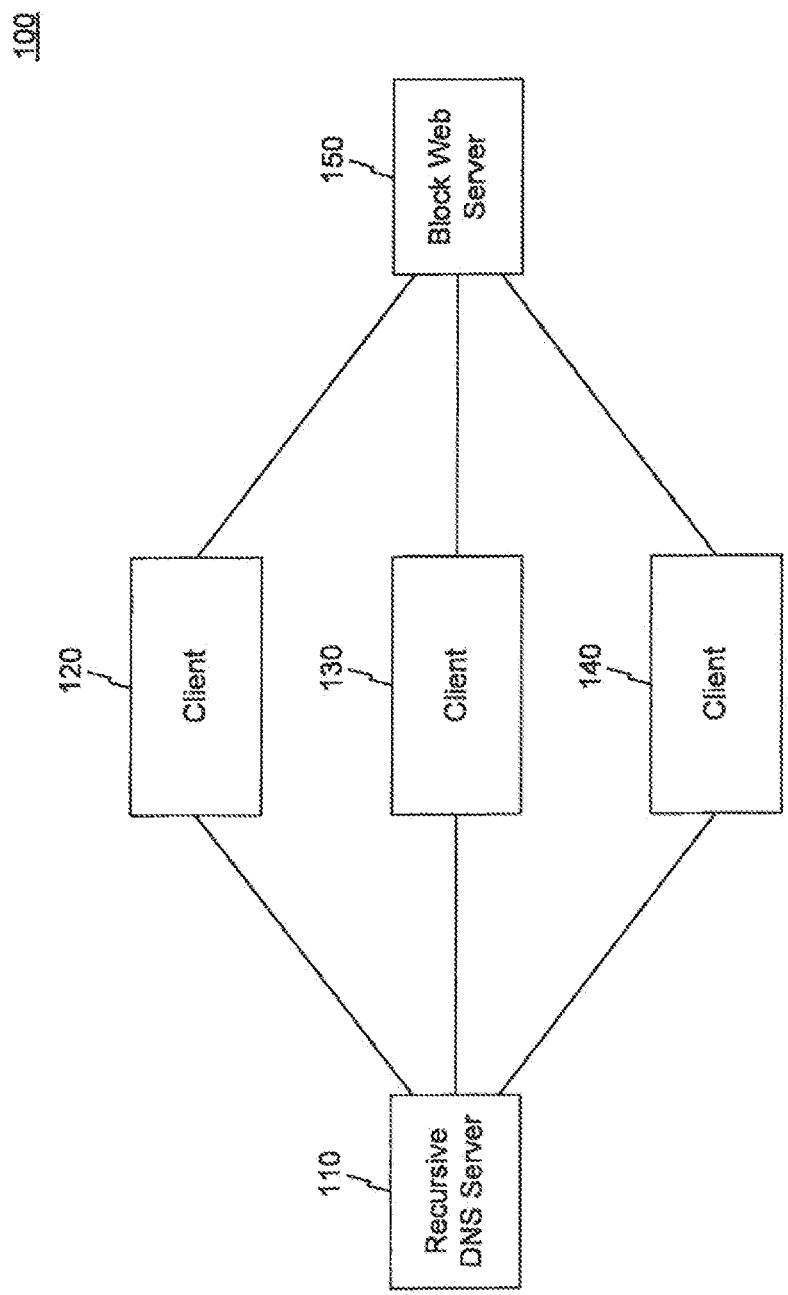
FIG. 1 is block diagram of a system consistent with disclosed embodiments.

FIG. 1 shows an exemplary system 100. System 100 includes a recursive DNS server 110. There may be more than one recursive DNS server 110 (not shown), and each recursive DNS server 110 may communicate with another recursive DNS server 110. Recursive DNS server 110 may be maintained by an Internet service provider, a domain registrar, or the like. Recursive DNS server 110 may store whitelisted web sites, which are web sites with approved content, and may store blacklisted web sites, which are web sites with unapproved content.

Clients 120, 130, and 140 may be computers that users use to access recursive DNS server 110 via the Internet. Clients 120, 130, and 140 may use Internet browsers to access web pages via the Internet.

Block web server 150 is a server that stores blocked web sites and their corresponding IP addresses. Blocked web sites are also known as blacklisted web sites, because these blocked web sites are associated with blacklisted material. Sites can include malicious sites, gambling sites, porn sites, time ting sites, and the like. Block web server 150 may be maintained by an Internet service provider, a domain registrar, or the like. In disclosed embodiments, when a domain is blacklisted (blocked), the user is redirected to a web page, called a "block page," that notifies the user that the site they were trying to reach is blocked and why. Recursive DNS server 110, clients 120, 130, and 140, and block web server 150 may interact via the Internet.

All web sites and web pages have IP addresses, numerical identifiers, typically represented by a particular quantity of octets, such as four octets for IPv4 and 16 octets for IPv6. However, such numerical identifiers are difficult for users to remember. Thus, a Domain Name System ("DNS") is provided, such that a user may enter a text identifier consisting of a multi-level domain name. If a user opens a web browser on client 120, for example, and types, e.g., http://www.example.com, into the browser, a recursive DNS process will begin, to "resolve" the domain name, that is, to convert the text identifier to a numeric IP address. The browser will first try to determine an IP address that corresponds to http://www.example.com using the browser's cache. The browser's cache can store many frequently used domain names and corresponding IP addresses. If the corresponding IP address is not found in the browser's cache, a DNS query is sent to recursive DNS servers 110 to resolve the domain name. However, if the entered domain name is present in the browser's cache but corresponds to a blacklisted site, the user will not be able to access the site, until the domain name and IP address of the blacklisted site is removed from the browser's cache.

Disclosed embodiments push bad entries out of a browser's cache by filling the cache with new entries. Disclosed embodiments include a feature called blocked site bypass used in Recursive DNS. This feature does not require the use of a proxy and allows customers to access a blacklisted site for an extended period of time. Disclosed embodiments update a DNS whitelist, which is a list of authorized IP addresses, for an extended period of time based on the receipt of DNS queries that encode the whitelist with entry details, such as IP address and machine locations, which are included in the query name. This approach and design enables a whitelist to be updated faster without having to distribute a whitelist's status to many different sites and servers.

Figure 2:
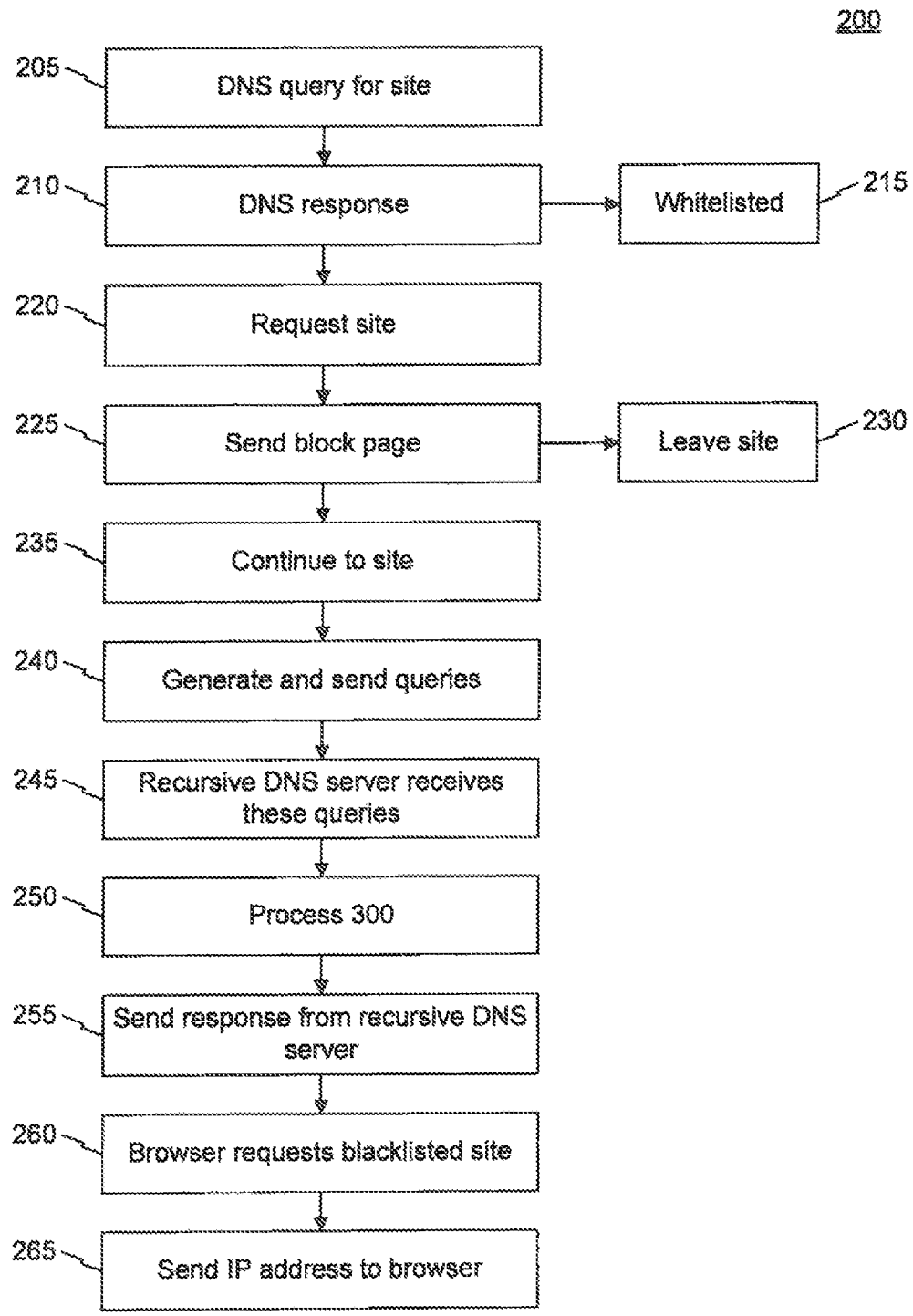
FIG. 2 is a flow chart describing user access to a blacklisted web site, consistent with disclosed embodiments.

FIG. 2 shows a process 200 in which a user accesses a blacklisted web site. A user, using client 120 for example, may enter a web site address, such as www.example.com, into a browser, may click a link that links to the address, or do something else to access a web site. It is determined if the domain name or the web site is blacklisted by Recursive DNS blacklists.

To determine if the site is blocked, the user's web browser sends a DNS query for www.example.com to recursive DNS server 110, shown at step 205, in FIG. 2. Recursive DNS server 110 may then try to determine if the user should be allowed to access the website.

As shown at step 210, if it is determined that recursive DNS server 110 finds a corresponding whitelisted IP address, corresponding to www.example.com, stored in recursive DNS server 110's cache (not blacklisted), recursive DNS server 110 may send a response and transmit the IP address to the user's browser, thereby allowing the user access to the site, shown at step 215. If it is determined that the site is blacklisted or blocked, a DNS response so indicating this, along with the "A record" corresponding to recursive DNS server 110, is sent from recursive DNS server 110 to client 120. An "A record" is an IPv4 address for a name server machine. Other embodiments can use other records, such as AAAA records, which are IPv6 addresses for name servers, and the like.

At 220, the user's browser then sends a request for the web site www.example.com to block web server 150. At 225, block web server 150 then sends a "block page" to the user's browser, where it is presented to the user.

Figure 4:
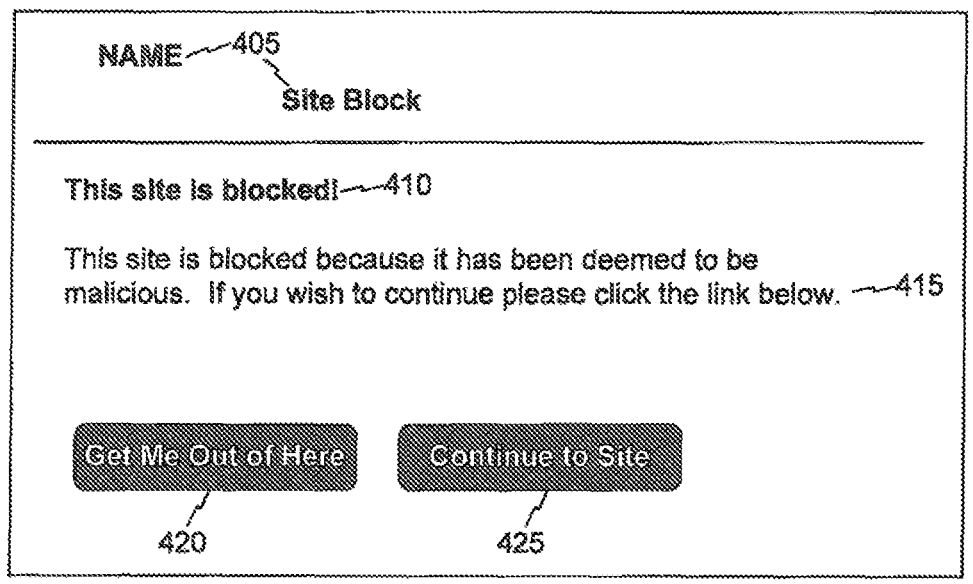
FIG. 4 is a diagram of an exemplary block page, consistent with disclosed embodiments.

FIG. 4 shows an exemplary block page 400. Block page 400 may include a title 405, which may indicate an Internet service provider, domain name registrar, or the like which may own and run the block page. Block page 400 may include a statement 410 indicating that the site the user is trying to access is blocked. Block page 400 may include a reason why the page is blocked 415, such as the site is malicious. Block page 400 may include selectable items, such as buttons 420 and 425, which may give the user a choice to leave the site or continue to the site.

Referring back to FIG. 2, at step 225, a block page is presented to the user with a reason why the site is blocked, such as the site being malicious. Block web server 150 may store the reason the site is blocked. The user may, for example, either click a button to indicate that the user does not want to access the site, such as a "Get Me Out of Here" button or click a button to indicate that the user wants to continue to the site, such as a "Continue to Site" button. If the user clicks the "Get Me Out of Here" button, the browser may close or bring the user to a whitelisted site, shown at step 230. If the user clicks the "Continue to Site" button to bypass the block page, the process continues to step 235.

Continuing at step 240, after a user clicks the "Continue to Site" button to bypass the block page, the user's web browser sends a plurality of DNS queries to recursive DNS server 110. The number of queries can be a configurable or predetermined number, such as 1, 20, or 300. The queries may be requested by JavaScript enabled on the user's browser. The queries are generated for an encoded domain name having the format: <nonce>.<hash>.<blocked-domain>.<static domain>.

The "nonce" is a unique identifier for each of the queries. The unique identifier may be a monotonically increasing number. For example, if 300 queries are made, a nonce for the first query can be "1," and a nonce for the second query can be "2," and so on until the 300$^{th}$ query can have a nonce of "300."

The "hash" is a label that can be, for example, a base32#hex-encoded, such as SHA1 or MD5, a cryptographic hash of the client IP, a normalized timestamp, the blocked domain, and a shared secret. The client IP is the IP address of the client that the user is using to access the blocked site. The normalized timestamp is the current time, rounded down to the nearest N minutes, where N is a number such as 5, for example. This will allow the hash to be valid for only 2*N minutes, in this case, 10 minutes. The normalized timestamp may be used to prevent replay attacks.

The shared secret may be a binary value of arbitrary length that is shared between recursive DNS servers 110 and web servers, such as block web server 150, hosting the block pages. Note that the shared secret is not exposed to the JavaScript in the block page of the browser that generates the DNS queries. Instead, block web server 150 dynamically generates the block page, including the calculated hash in the JavaScript.

The "blocked domain" may be the domain name that has been blacklisted. The "static domain" is a constant domain that allows recursive DNS server 110 to easily recognize the query name as a whitelisting query, for example "block.vrsn.com".

Figure 3:
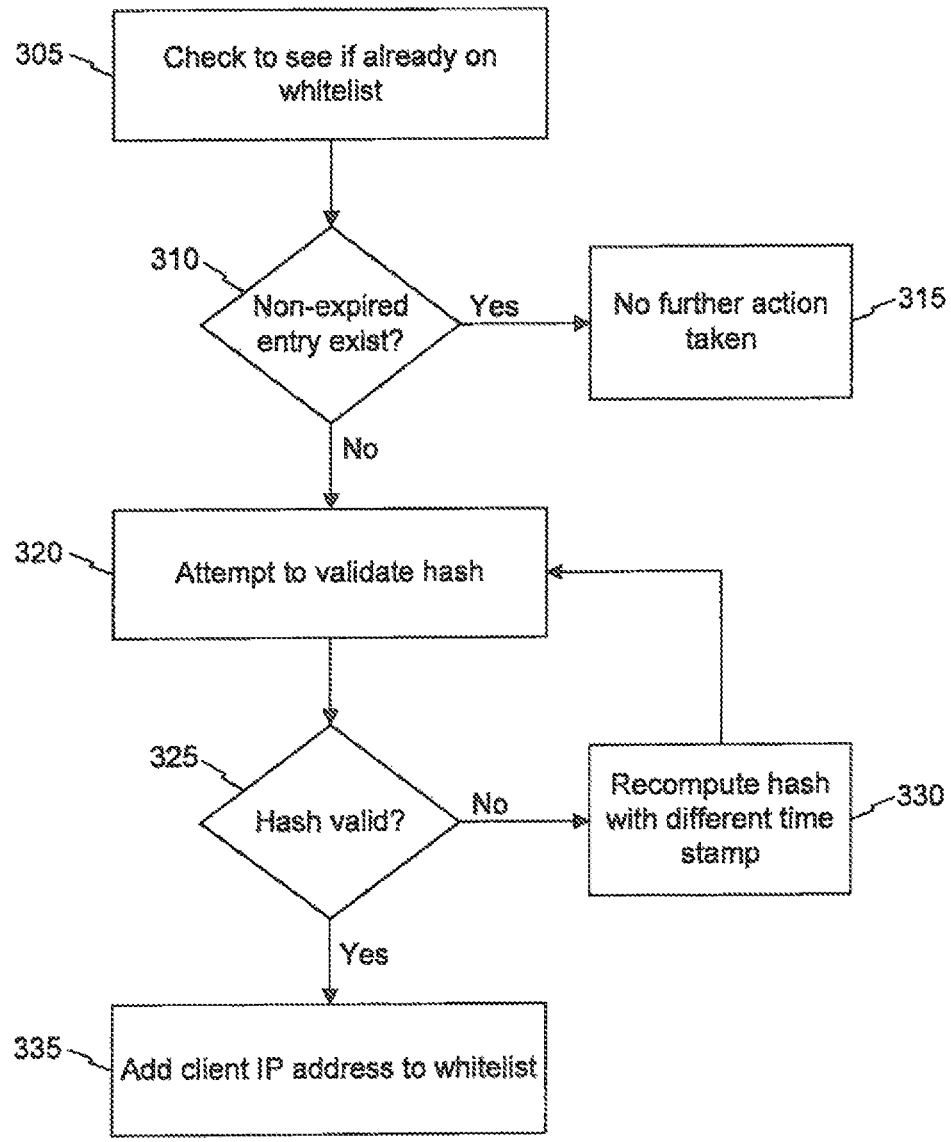
FIG. 3 is a flow chart describing in greater detail one of the steps of FIG. 2.

Referring to step 245 of FIG. 2, when recursive DNS server 110, which may use a proxy, receives these queries, recursive DNS server 110 initiates a validation process for the queries, shown at step 250. Step 250 is shown in more detail in FIG. 3, which shows a process 300 describing recursive DNS server 110's validation process for the queries.

At step 305, recursive DNS server 119 checks to see if there is already a whitelist entry for the client IP address and the blocked domain pair. At step 310, it is determined if a non-expired whitest entry exists for blocked domain. If there is a non-expired whitelist entry, the process stops, and the user is allowed to proceed to the site, shown at step 315.

If the whitelist entry does not exist, or it has expired, then recursive DNS server 110 tries to validate the hash, where the hash comprises the client IP address, the timestamp, the shared secret, and the blocked domain, as shown at step 320. A valid hash means that recursive DNS server 110 determines that the hash, and therefore also the blocked domain, is approved to be added to a whitelist.

At step 325, it is determined if the hash is valid. If the hash fails to validate, shown at step 330, the A record for the blocked page is returned, and the hash is recomputed with a different timestamp. For example, if the timestamp is for the nearest 5 minutes rounded down, the recomputed hash would replace the time stamp of the original hash with the timestamp from 5 minutes earlier. Then the process returns to step 320 where recursive DNS server 110 tries to validate the recomputed hash.

If the hash is valid, an entry, which may be temporary, is added to the whitelist stored in recursive DNS server 110 for the client IP address and the blocked do shown at step 335. This whitelist entry may be valid for only the 2*N minutes the timestamp covers, where N was described above and in which 2*N would be 10 minutes in this example. After the expiration of the whitelist entry, that is, after 10 minutes, the blocked domain name will be blacklisted for the user's IP address. Thus the user will not be able to access the site after expiration of the whitelist entry.

In addition, a message may be sent to a database owned by the Internet service provider, domain name registrar, or entity that runs recursive DNS server 110 and/or block web server 150 to indicate that a whitelisted entry should be added to a record corresponding to the user IP address and blocked domain, with the expiration time. This information can then be set to sites and machines within a predetermined amount of time, such as 45 seconds.

Referring back to FIG. 2, at step 255, recursive DNS server 110 sends a response for each of the queries back to the browser's cache, thereby filling the browser cache with entries consisting of these DNS responses. This may serve two purposes. First, this pushes the block web server IP address out of the browser's cache by filling the cache with the DNS entries. Second, this ensures enough queries are seen at recursive DNS servers 110 such that all of the recursive DNS servers 110 can update their whitelists.

At this point, the JavaScript on the user's browser waits a predetermined amount of time, such as 1 or 5 seconds, before requesting to reload the web site. Then, at step 260, the browser sends a request far the web site www.example.com. At step 265, because this web site is now whitelisted, recursive DNS server 110 sends the real IP address corresponding to www.example.com to the user's browser, and the user is able to access the web site, without receiving a block page, for the time period of 2*N, which is 10 minutes in this example.

In some embodiments, JavaScript receives the correct IP address for the site, and the web page automatically loads as if the web page were not blocked. In other embodiments, JavaScript redirects the user to a web site, such as "https://block.vrsn.com/index.html?r=<Base64 encoded URL>", on the page to which the user was redirected, and a confirmation page appears. If the user clicks on the "Yes, really go to a blocked site" button, JavaScript may decode the encoded blocked site's domain name, open a new browser window with that domain name, and close the original browser window.

By including a cryptographic hash in the whitelisting query, it becomes computationally infeasible for an attacker to generate fake whitelisting queries on behalf of a client. For example, a malicious user or attacker could not automatically generate whitelisting queries without reaching the block page, because the user does not know the shared secret. The user also cannot reuse old whitelisting queries, since the hash contains a timestamp, as a security feature. Since a large number of queries, which may differ only by "nonce," are sent to recursive DNS server 110, there is no need to coordinate whitelists among recursive server instances, because in all instances, the individual recursive servers will receive some portion of the queries.

In some embodiments, only a configured subset of the DNS queries will undergo complete processing. For example, if 300 queries are sent from the browser, only about 10% may be processed. For example, one of the first few DNS queries may result in a validation. After this validation, no additional processing would be required for that client IP and blocked domain pair until the whitelist entry expires.

For another example, only a configured percentage or number of the DNS queries for a particular client IP and blocked domain pair will be processed. In some embodiments, the number of hashes calculated per client IP address can be limited, thereby disregarding the blocked domain because most users would not be frequently browsing block sites. However, the large predetermined number of DNS queries issued from the user's browser is still necessary to push the blocked DNS entries out of the browser's cache.

Figure 5:
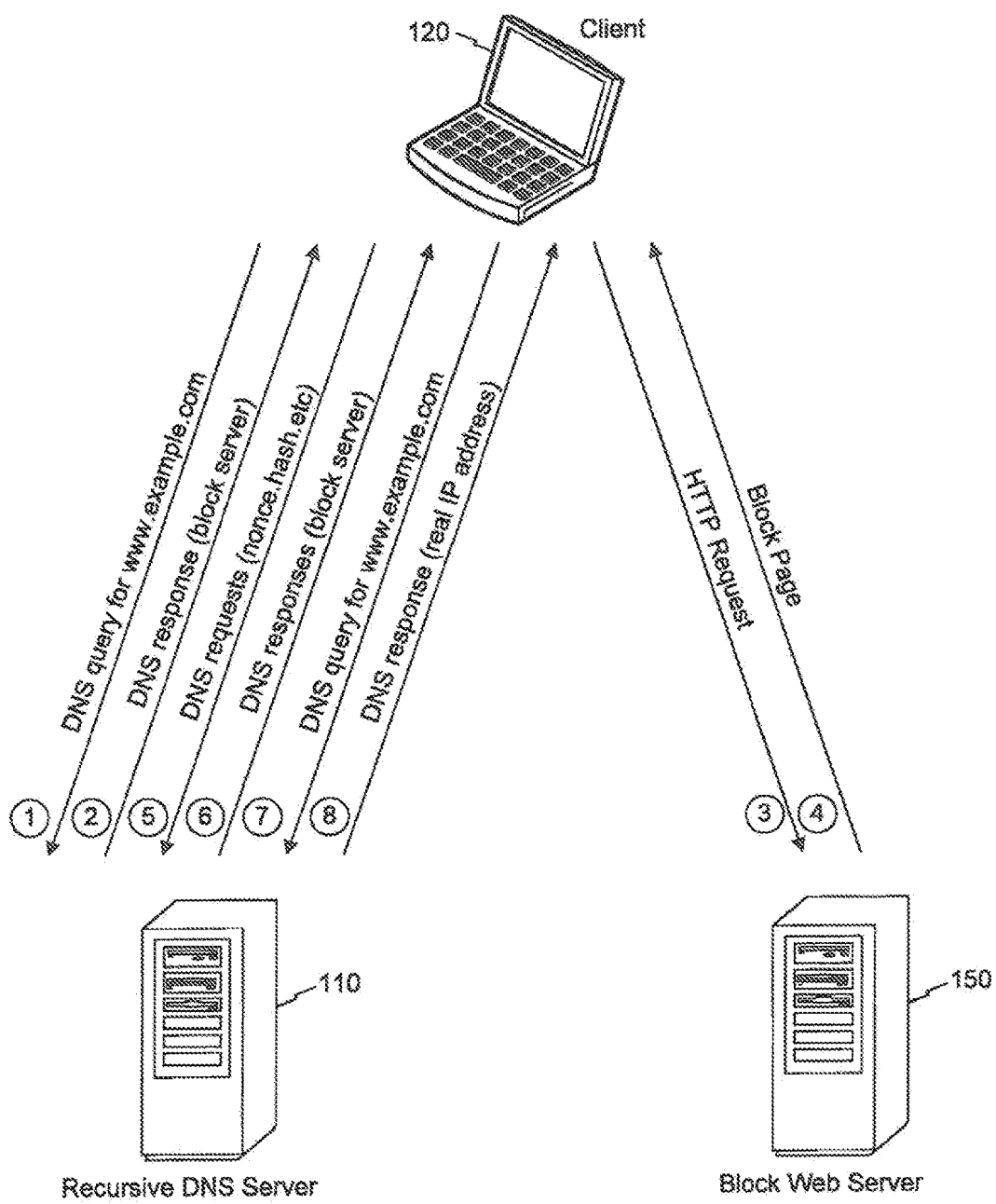
FIG. 5 is a condensed chart describing user access to a blacklisted web site, consistent with disclosed embodiments.

FIG. 5 shows a condensed chart of an exemplary process of the disclosed embodiments, which includes recursive DNS server 110, client 120, and block web server 150.

Figure 6A:
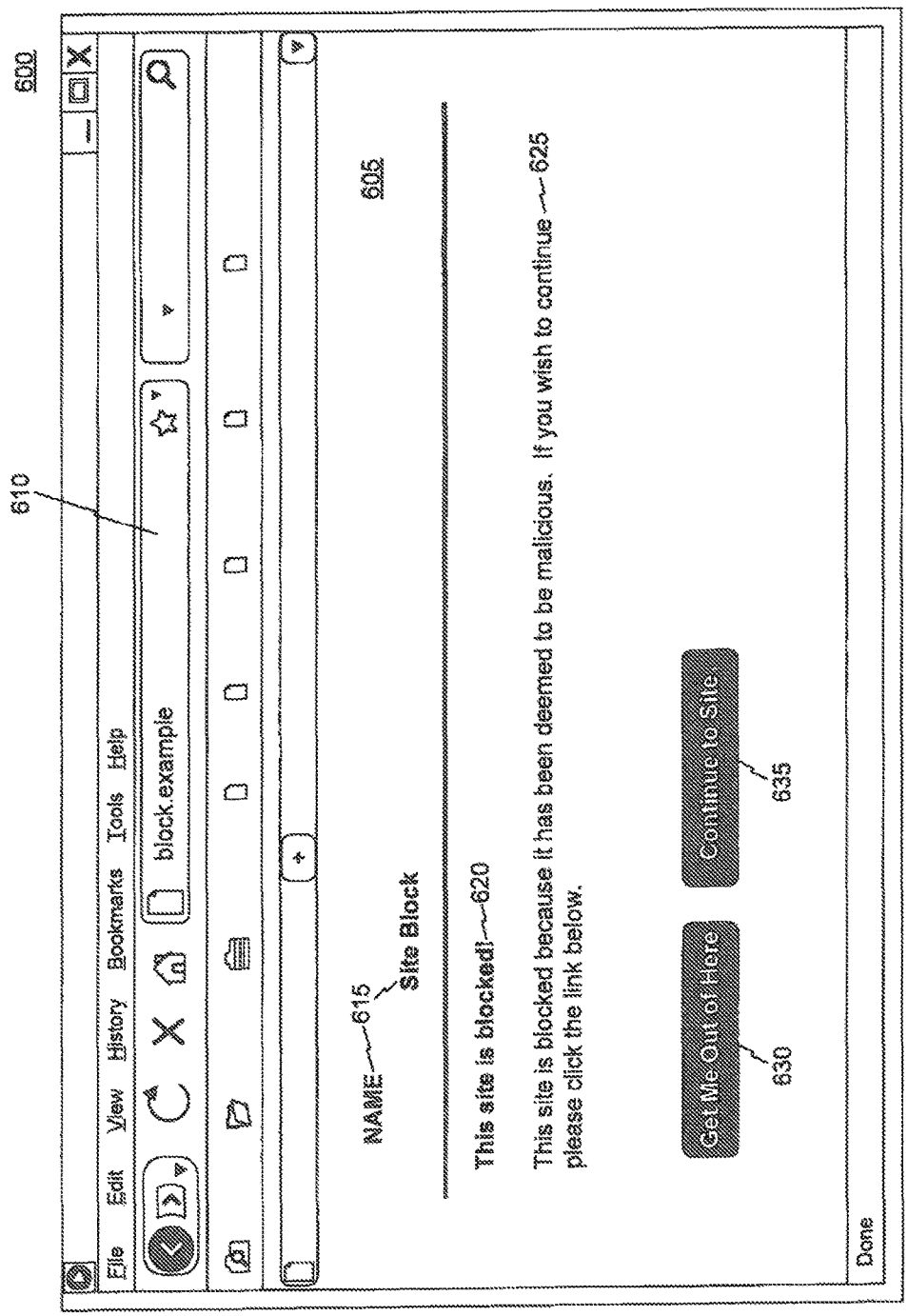
FIGS. 6A and 6B are diagrams showing a first example of a user attempt to access a blocked web page.
Figure 6B:
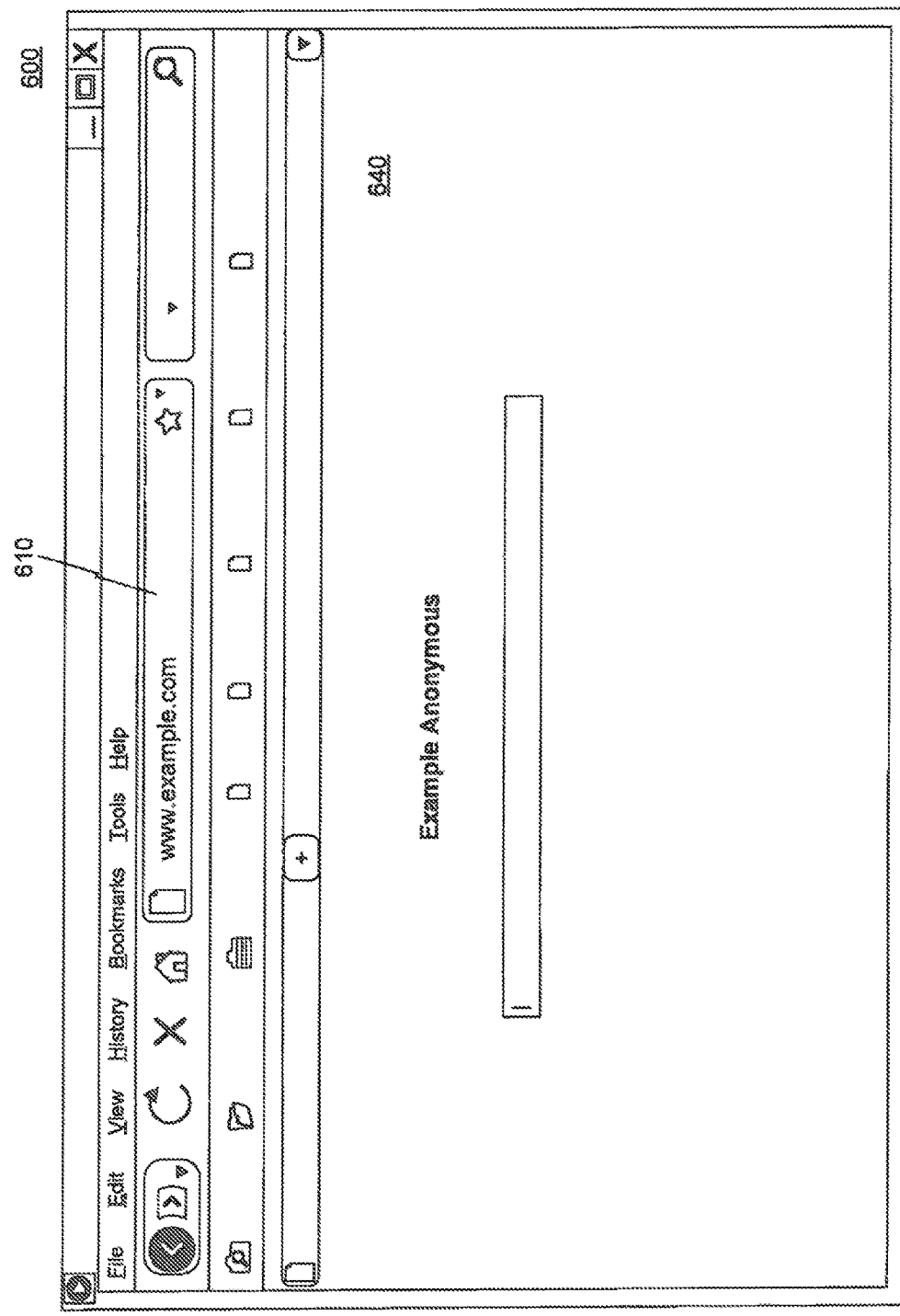

FIGS. 6A and 6B show an example of a user trying to access a blacklisted domain name, with the user being automatically brought to the corresponding web page after clicking a selectable item on a block page. As shown in display 600 of FIG. 6A, a user may open a browser and navigate to a web page by entering a blacklisted domain name, such as www.example.com, on address line 610. After trying to access this blacklisted domain, as described above, a block page 605 may be displayed. Block page 605 may include a title 615, a statement 620 that states the site is blocked, a reason 625 that describes a reason the site is blocked, and selectable items, such as buttons 630 and 635, which may give the user a choice to leave the site or continue to the site.

If the user clicks on button 630 to leave the blacklisted site, the browser may close, or the user may be brought to a whitelisted web site. If the user clicks on button 635 to continue to the blacklisted site, the processes described above take place, and in this example, JavaScript enables the browser to automatically reload the blacklisted website, and brings the user to the blacklisted web page 640, shown in FIG. 6B.

Figure 7A:
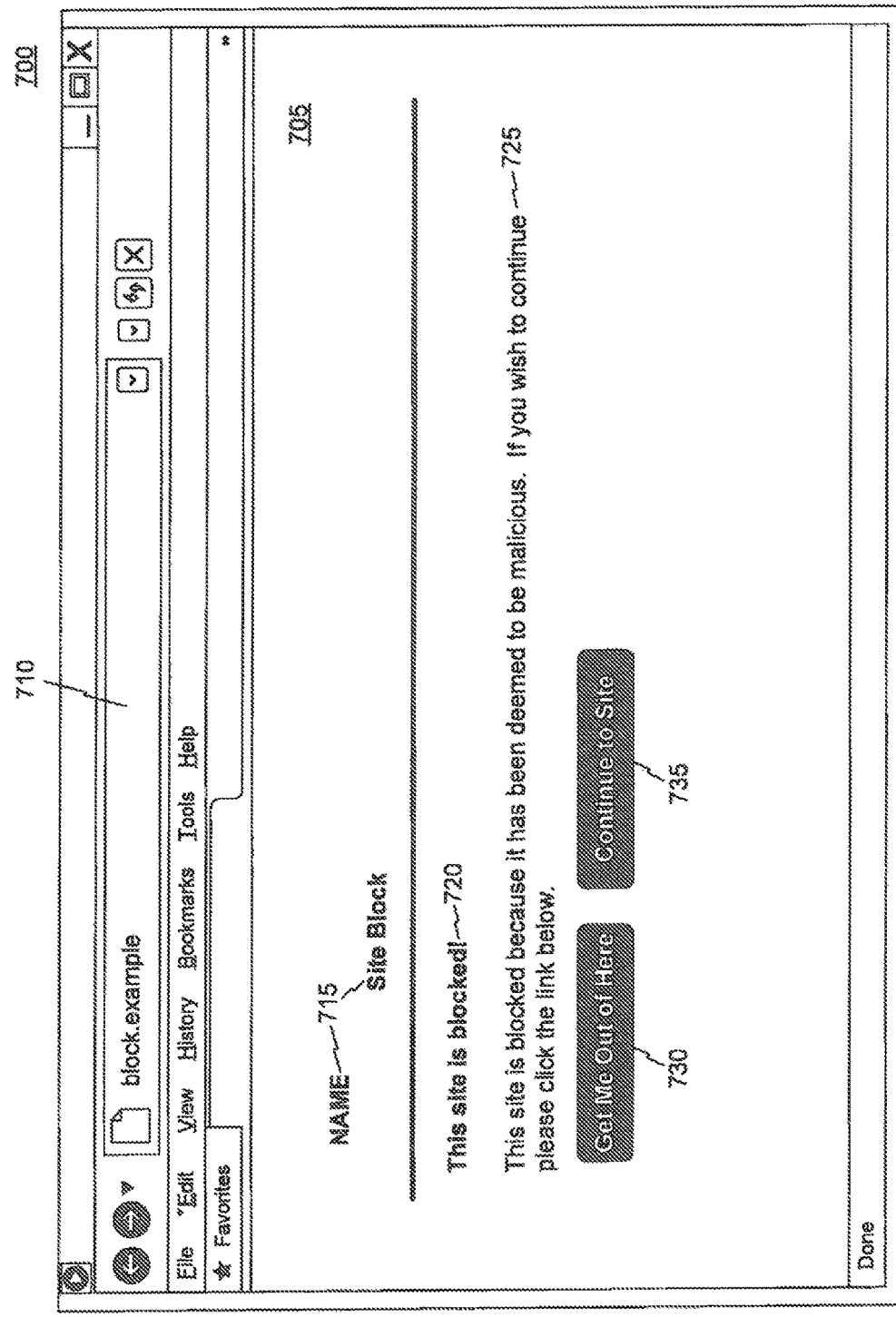
FIGS. 7A, 7B, and 7C are diagrams showing a second example of a user attempt to access a blocked web page.
Figure 7B:
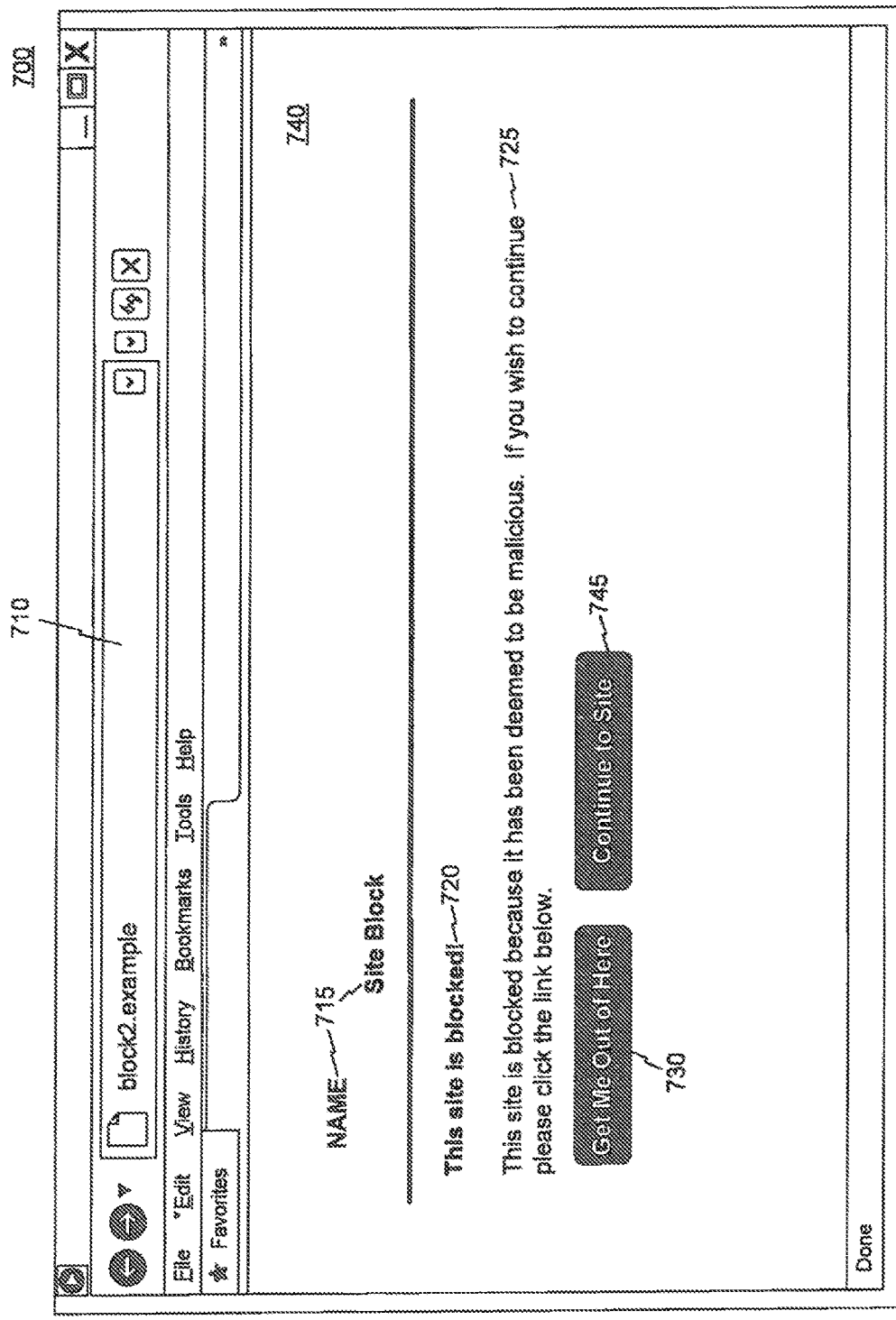
Figure 7C:
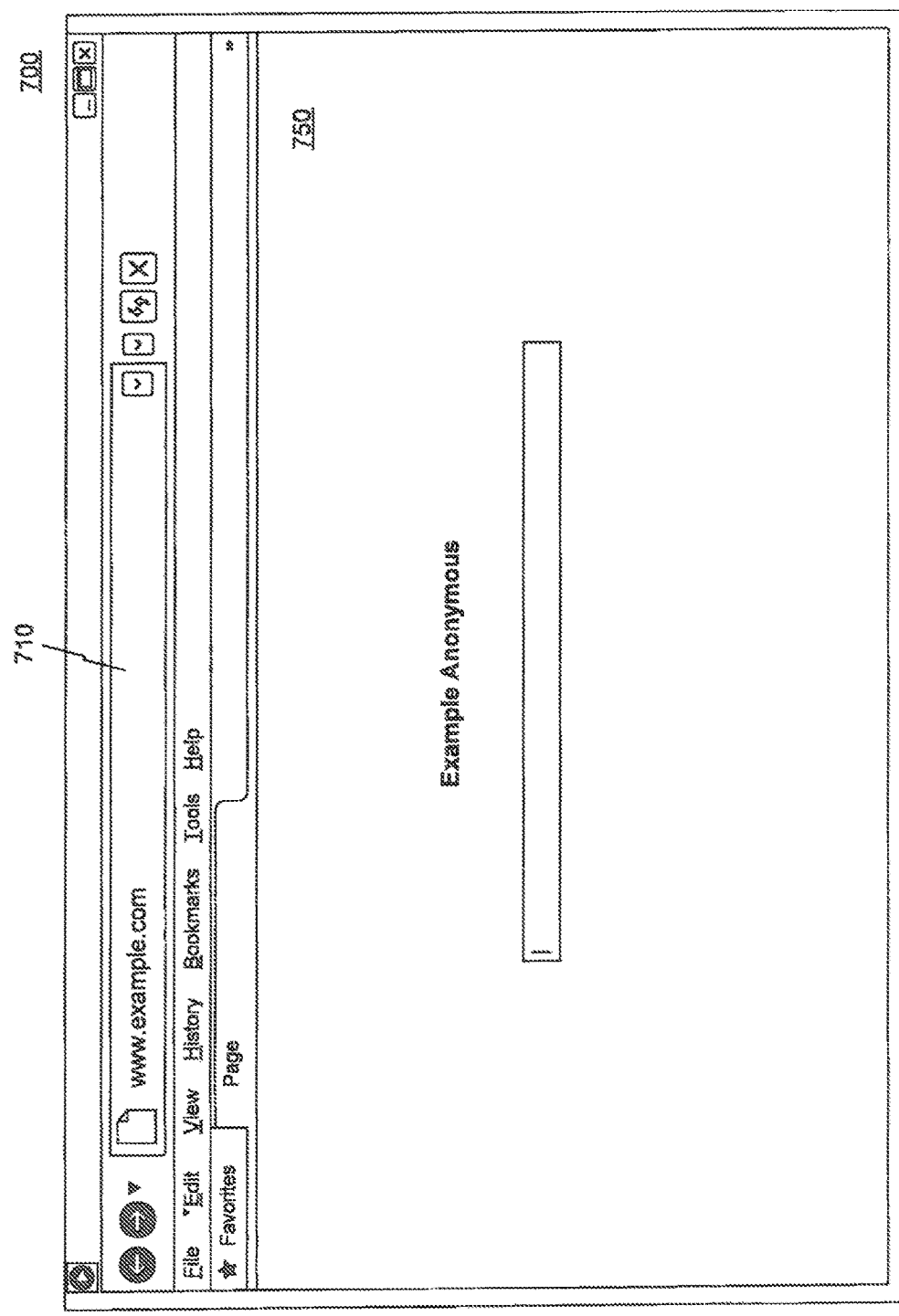

FIGS. 7A, 7B, and 7C show browser displays of a user trying to access a blacklisted domain name, for which the user is brought to a second block page after trying to access the blocked web page. As shown in display 700 of FIG. 7A, a user may open a browser and navigate to a web page by entering a blacklisted domain name, such as www.example-.com, on address line 710. After trying to access this blacklisted domain, as described above, a block page 705 may be displayed. Block page 705 may include a title 715, a statement 720 that states the site is blocked, a reason 725 that describes a reason the site is blocked, and selectable items, such as buttons 730 and 735, which may give the user a choice to leave the site or continue to the site.

If the user clicks on button 730 to leave the blacklisted site, the browser may close, or the user may be brought to a whitelisted web site. If the user clicks on button 735 to continue to the blacklisted site, the processes as described above take place, and in this example, the user is brought to a second block page 740, shown in FIG. 7B. This block page may serve as protection when a user mistakenly clicks button 735 to continue to the blacklisted site but does not actually want to continue to the site.

Block page 740 may include a title 715, a statement 720 that states the site is blocked, a reason 725 that describes a r n the site is blocked, and selectable items, such as buttons 730 and 745, which may give the user a choice to leave the site or ask if the user is sure the user wants to continue to the blocked site. If the user presses button 745, JavaScript enables the browser to automatically reload the blacklisted website, and bring the user to the blacklisted web page 750, shown in FIG. 7C.

Figure 8A:
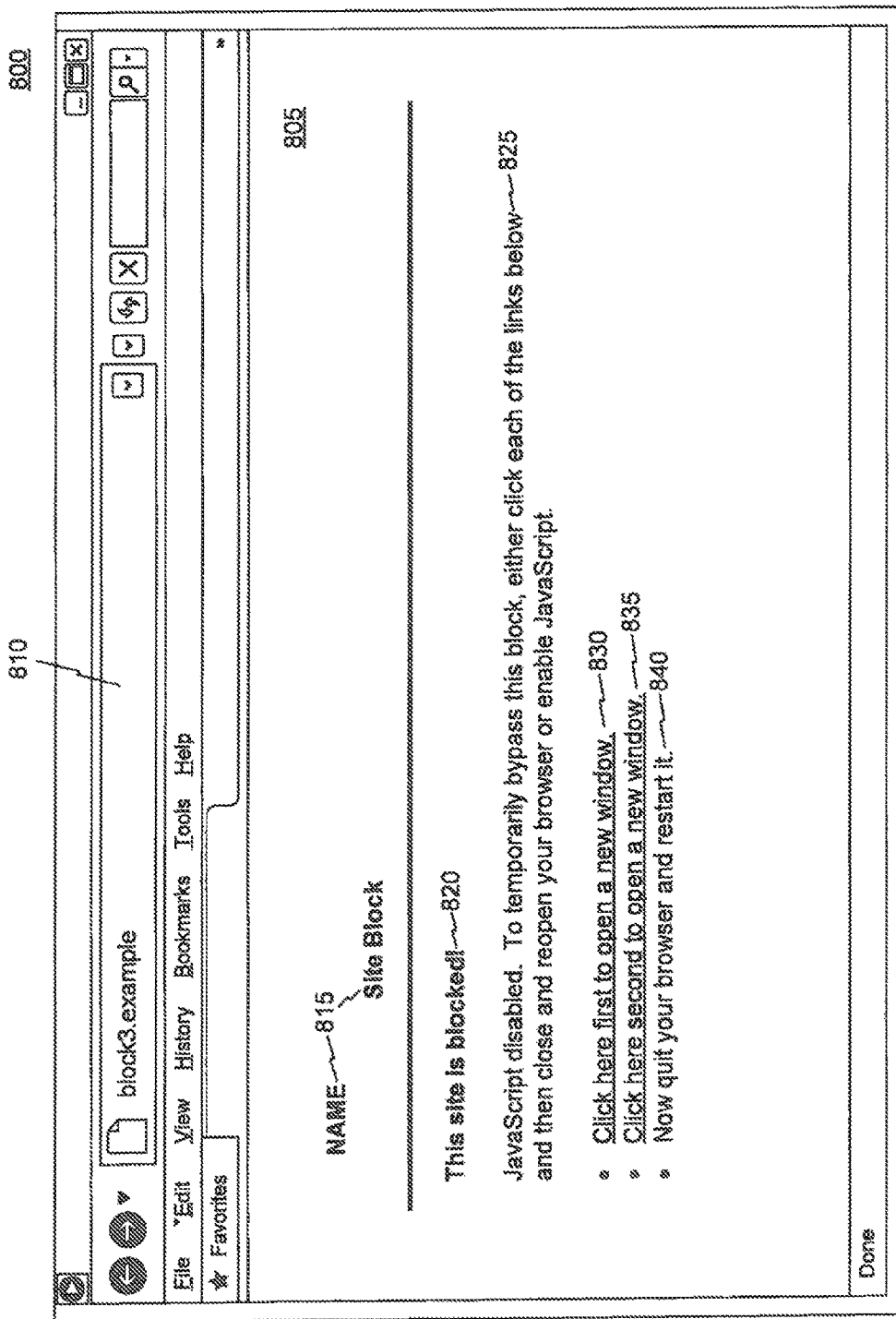
FIGS. 8A, 8B, 8C, 8D, 8E and 8F are diagrams showing a third example of a user attempt to access a blocked web page.

FIGS. 8A-8F show browser displays of a user trying to access a blacklisted do name, with JavaScript disabled on the user's browser. As shown in FIG. 8A, a user may open the browser and navigate to a web page 805 by entering a blacklisted domain name, such as www.example.com, on address line 810. After trying to access this blacklisted domain, as described above, a block page 805 may be displayed. Block page 805 may include a title 815, a statement 820 that states the site is blocked, and a reason 825 (JavaScript is disabled), and may tell the user ho to proceed to access the blocked web page. To temporarily bypass the blocked web page, the user may either click each of the links below, and then close and reopen the browser, or may enable JavaScript. Accordingly, selectable items, such as links 830 and 835, are included on block page 805. Link 830 may state "Click here first to open a new window." Link 835 may state "Click here second to open a new window," Finally, an instruction 840 may state "Now quit your browser and restart it."

Figure 8B:
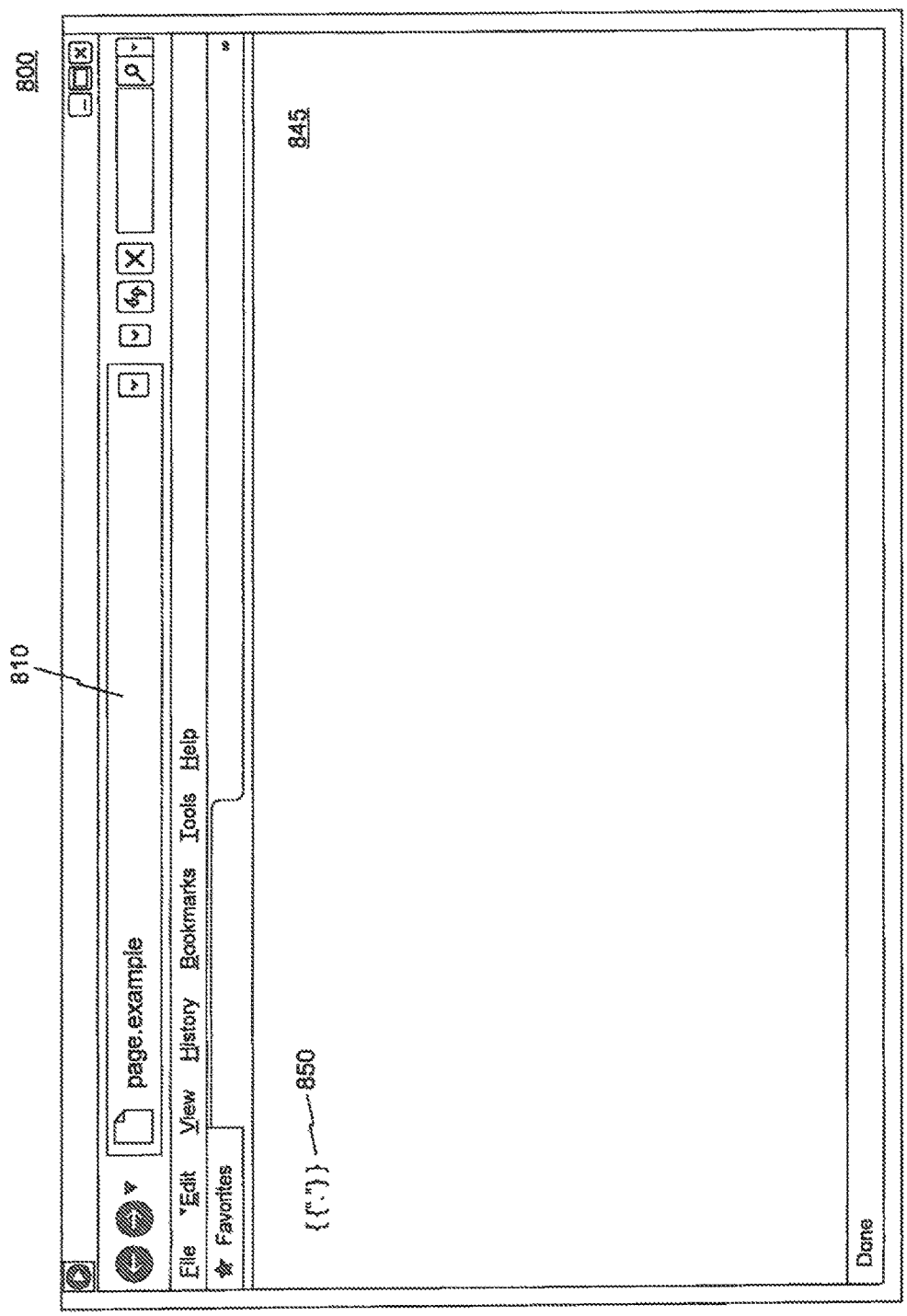
Figure 8C:
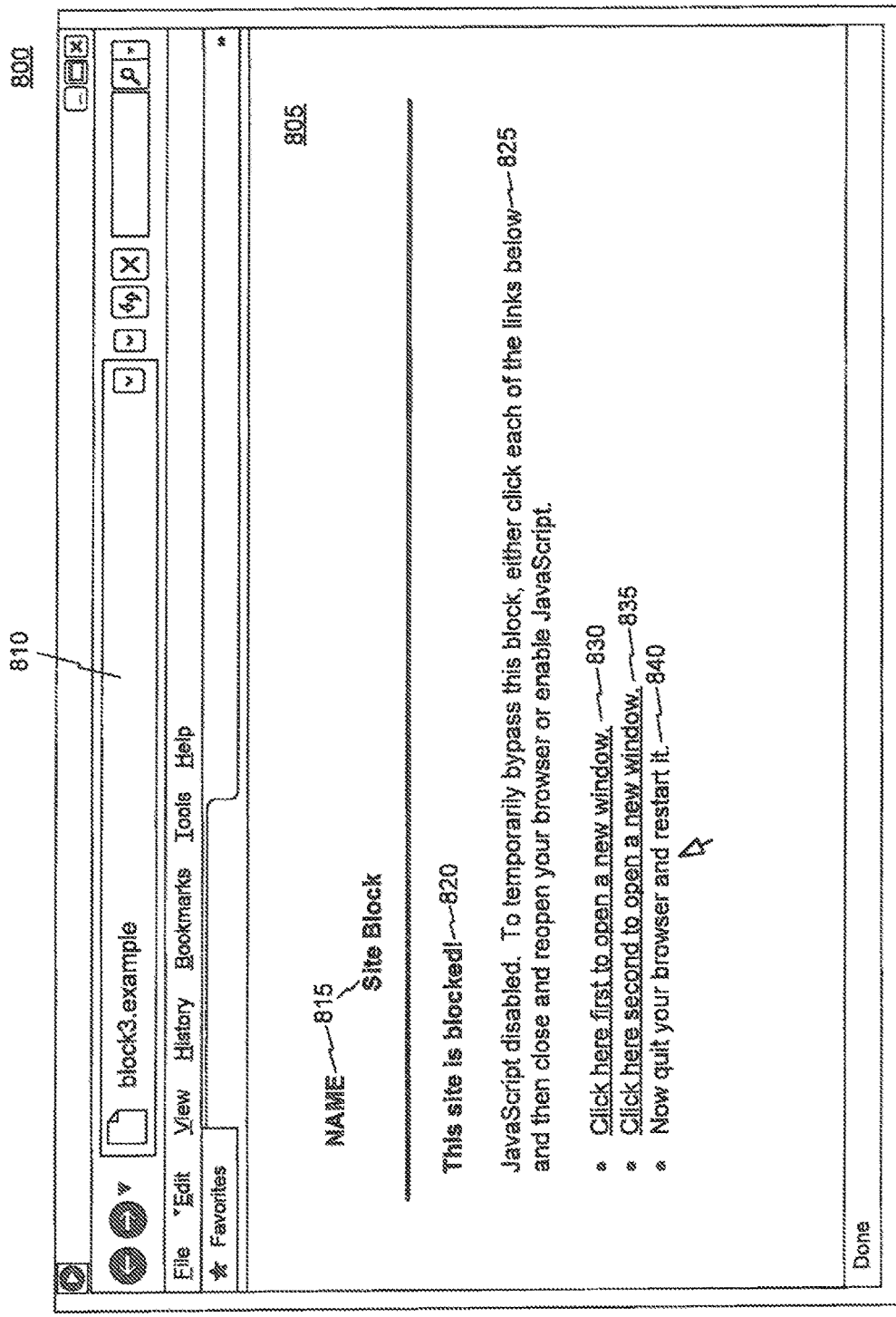
Figure 8D:
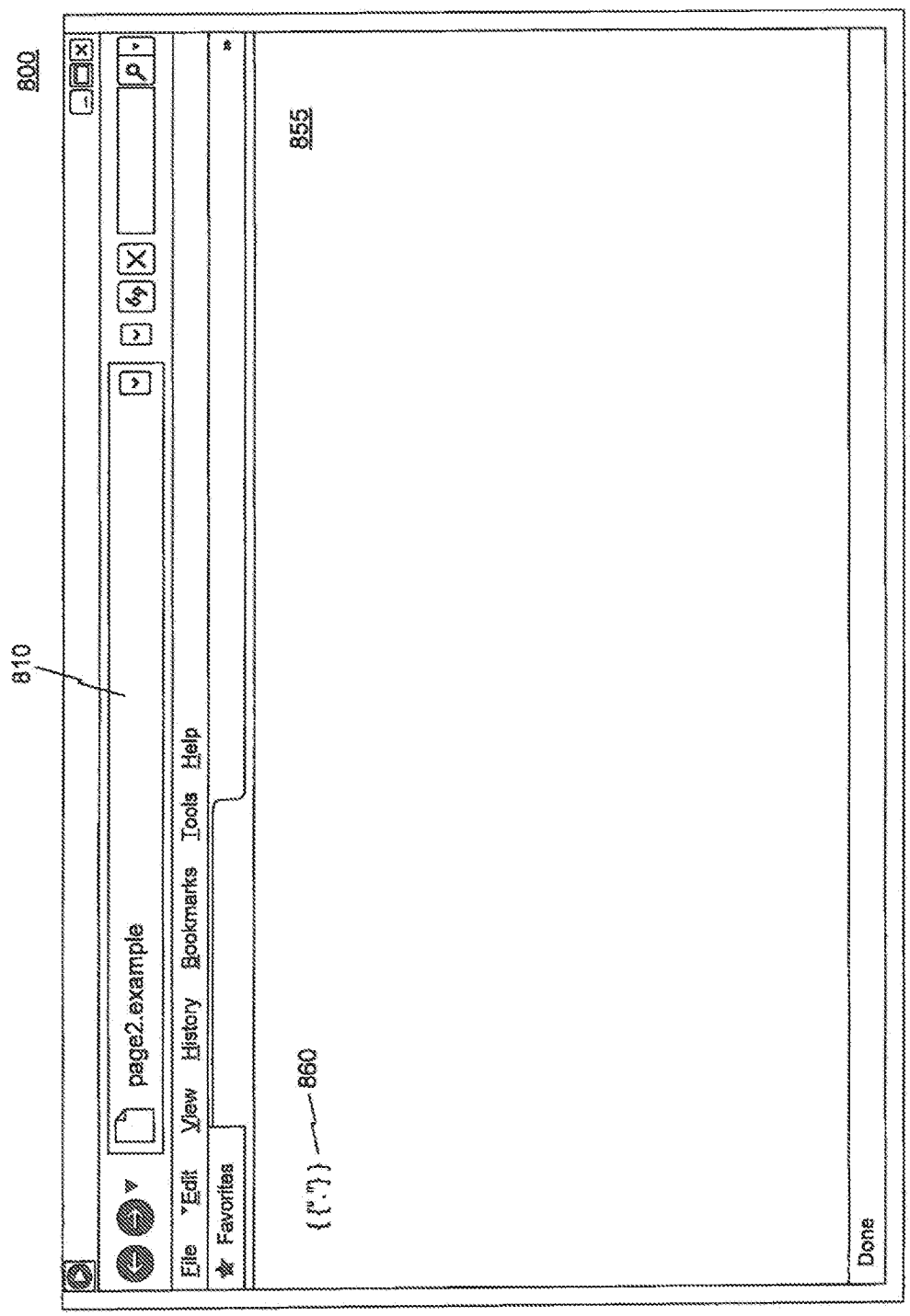

When a user clicks link 830, web page 845 is displayed, shown in FIG. 8B. Web page 845 may include content 850. The user can either close web page 845 or click back on the window of the browser that contains block page 805. After closing web page 845 or selecting block page 805, the user is again presented with block page 805, shown in FIG. 8C. Now the user can select link 835. After selecting link 835, web page 855 is presented to the user, shown in FIG. 8D. Web page 855 may include content 860.

Figure 8E:
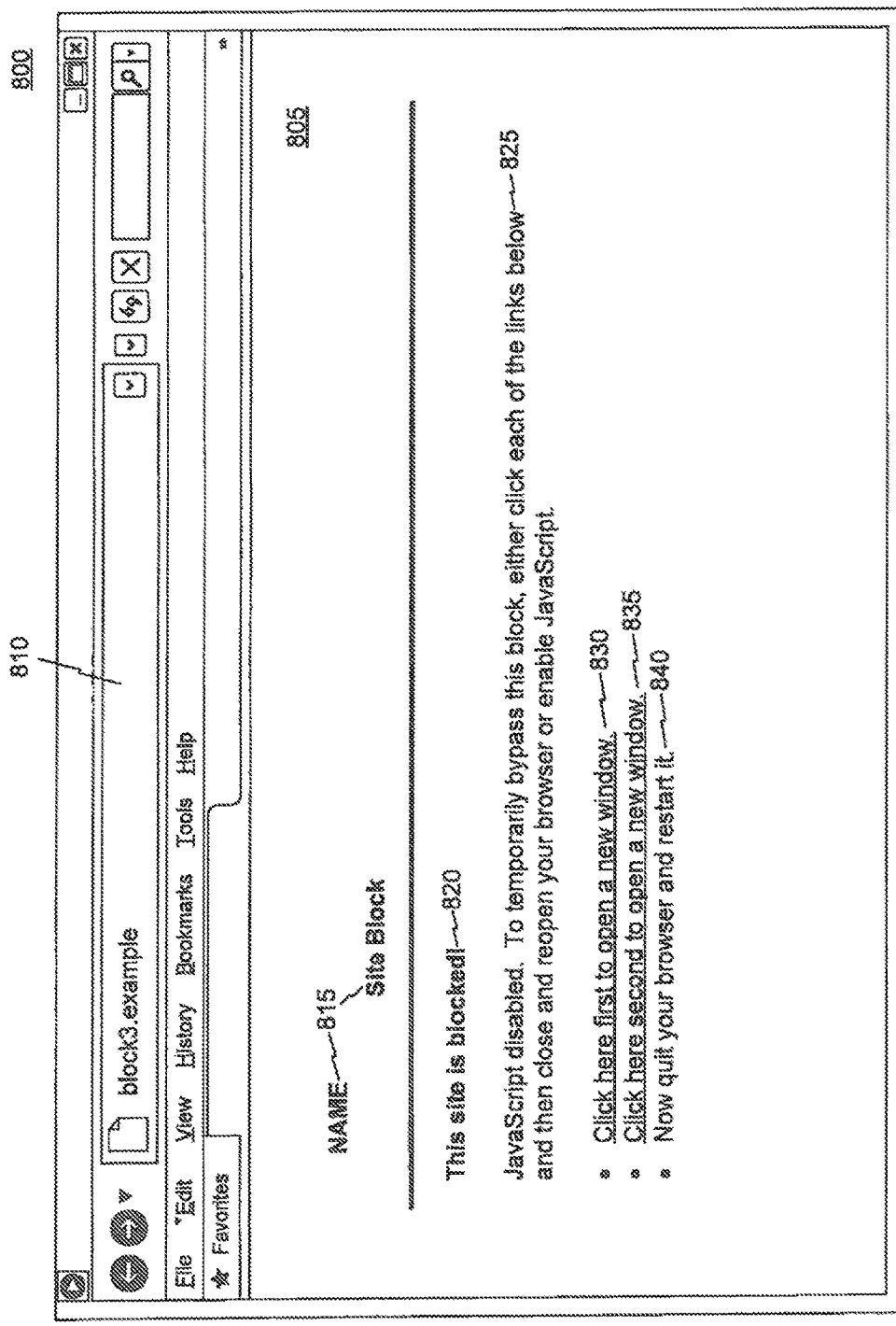
Figure 8F:
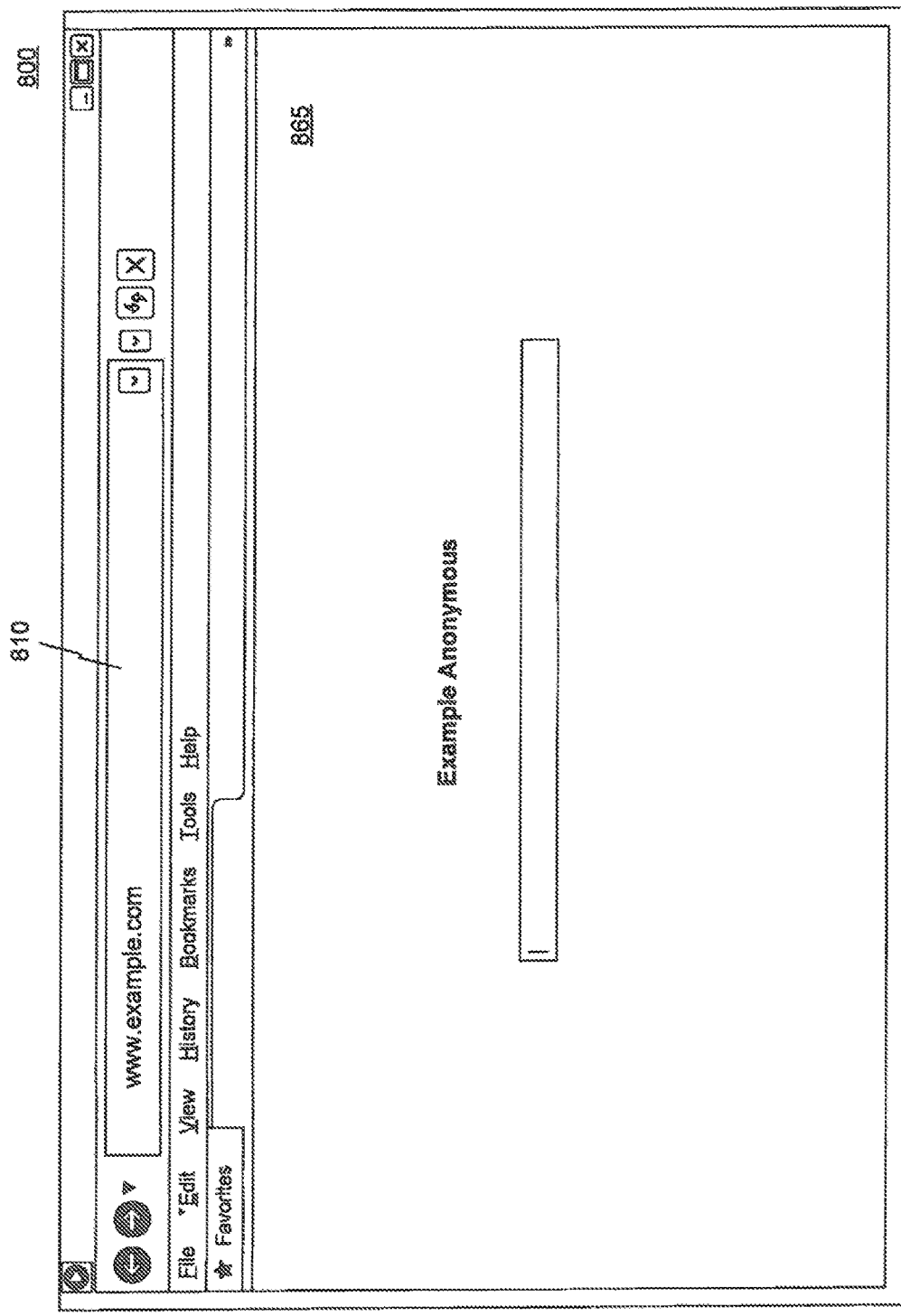

Again, the user may either close web page 855 or click back on the window of the browser that contains block page 805, both of which will present block page 805 to the user, shown in FIG. 8E. The user can now read and follow instruction 840, which tells the user to quit the browser and restart it. After the user quits and restarts the browser, the processes described above take place, and the user is presented with blocked web page 855, shown in FIG. 8F.

A further embodiment may provide to a user, operating client 120, an option to unblock a category of web sites that is classified or characterized by a particular subject, such as gambling. Thus, if a user is trying to access a blacklisted gambling site, the user may have the option to unblock all associated gambling sites. In this case, after the web browser sends a web site query to Recursive DNS server 110, Recursive DNS server 110 searches for and finds the category associated with the web site, and, as described above, a process begins for unblocking all sites in this category.

In a further additional embodiment, a user may be presented with a block page that includes buttons or other types of selectable items, a first one of which may unblock a single blacklisted web site, e.g., a gambling site, and a second one of which may unblock the entire category of web sites associated with the blacklisted website, e.g., all gambling sites. Thus, when a user selects a "category" button to unblock an entire category of web site domain names, a query, different from a query used to unblock a single web site domain name, may be sent from the web browser to Recursive DNS server 110. This "category" query would request domain names of all web sites associated with a particular category. Then, as described above, a process for whitelisting the entire category of web sites would begin.

Figure 9:
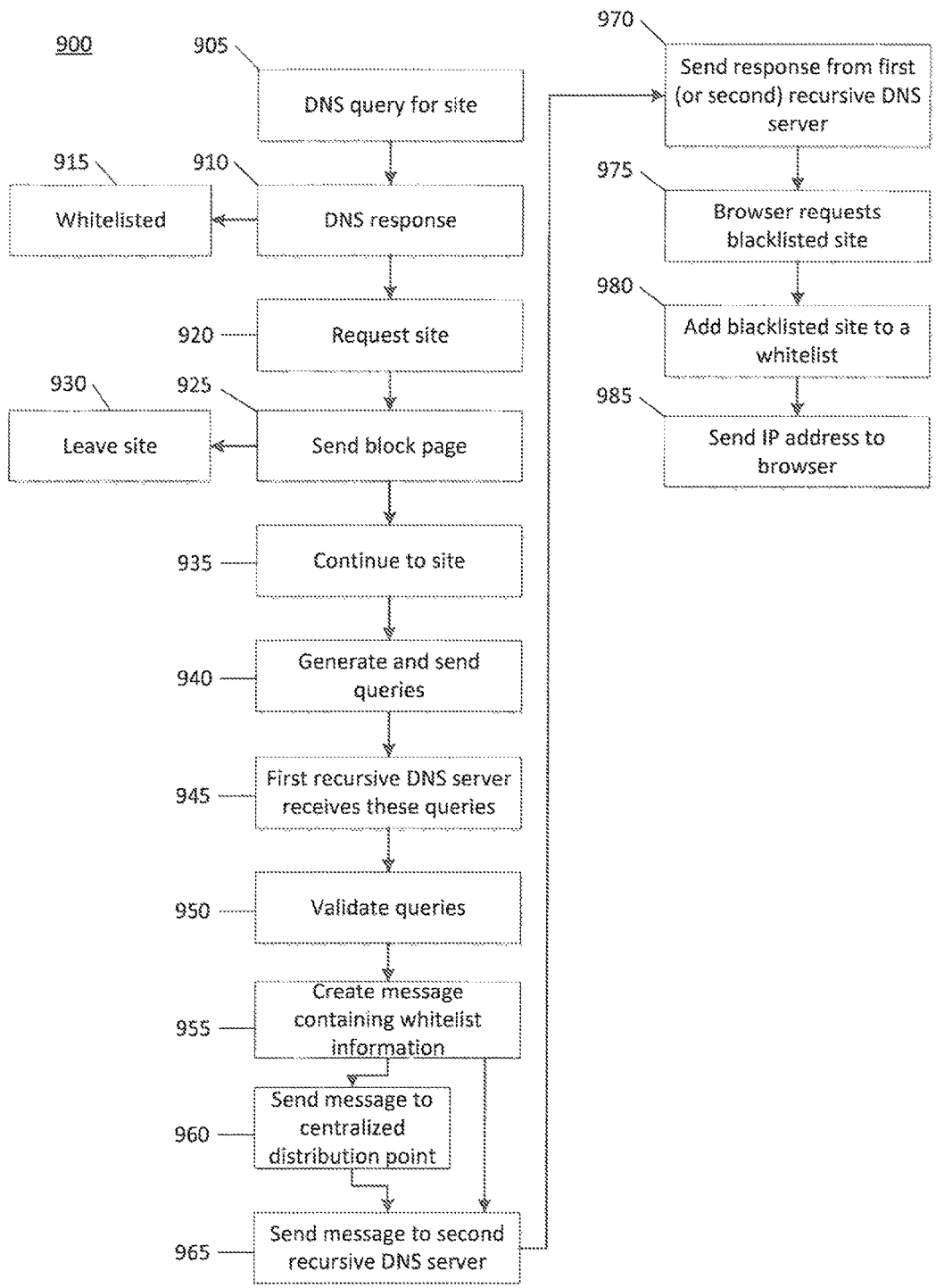
FIG. 9 is a flow chart describing a method for distributing a white list entry.

FIG. 9 is a flow chart 900 describing a method for adding a blacklisted site to a whitelist and distributing the whitelist entry. Referring to FIGS. 1 and 9 a user may enter a web site address, such as www.example.com, into a browser, may click a link that links to the address, or do something else to access a web site. It is determined if the domain name or the web site is blacklisted by Recursive DNS blacklists.

To determine if the site is blocked, the user's web browser sends a DNS query for www.example.com to the recursive DNS server 110, shown at step 905, in FIG. 9. The recursive DNS server 110 may then try to determine if the user should be allowed to access the website.

As shown at step 910, if it is determined that the recursive DNS server 110 finds a corresponding whitelisted IP address, corresponding to www.example.com, stored in the recursive DNS server 110's cache (not blacklisted), the recursive DNS server 110 may send a response and transmit the IP address to the user's browser, thereby allowing the user access to the site, shown at step 915. If it is determined that the site is blacklisted or blocked, a DNS response so indicating this, along with the "A record" corresponding to the block web server 150, is sent from the recursive DNS server 10 to the client 120.

At 920, the user's browser then sends a request for the web site www.example.com to the block web server 150. At 925, the block web server 150 then sends a "block page" to the user's browser, where it is presented to the user. The block web server 150 may store the reason the site is blocked. The user may, for example, either click a button to indicate that the user does not want to access the site, such as a "Get Me Out of Here" button, or click a button to indicate that the user wants to continue to the site, such as a "Continue to Site" button. If the user clicks the "Get Me Out of Here" button, the browser may close or bring the user to a whitelisted site, shown at step 930. If the user clicks the "Continue to Site" button to bypass the block page, the process continues to step 935.

Continuing at step 940, after a user clicks the "Continue to Site" button to bypass the block page, the user's web browser sends one or more DNS queries to the recursive DNS server 110. The number of queries can be a configurable or predetermined number, such as 1, 20, or 300. The one or e queries may be requested by the user's browser (e.g., by JavaScript enabled on the user's browser). This may be done to exceed the browser's DNS cache so that the now unblocked answer may be inserted therein. The one or more queries are generated for an encoded domain name having the tag format: <nonce>.<hash>.<blocked-domain>.<static domain>. Each may be separated by a delimiter (e.g., ".").

Referring to step 945, when the recursive DNS server 110, which may use a proxy, receives the one or more queries, the recursive DNS server 110 initiates a validation process for the one or more queries, shown at step 950. Once validated, the recursive DNS server 110 may create a message containing the whitelist information, as shown at step 955. The whitelist information may include the source IP address (e.g., the IP address of the user), a user identifier, the blocked domain, a timestamp, a combination thereof, or the like. The user identifier may be used to identify the user and/or the computer system of the user. The timestamp may be used to determine when the whitelist expires.

The message may then be sent from the recursive DNS server 110 to a centralized distribution point, as at step 960. As used herein, the term "centralized distribution point" refers to another server that can distribute the message to other recursive DNS servers and/or other servers that may desire or require the message, such as a fan-out distribution host. The centralized distribution point may then send the message to one or more other recursive DNS servers, as at step 965. In another embodiment, the message may be sent (e.g., directly) from the recursive DNS server to a one or more neighboring recursive DNS servers, as also shown at step 965. In yet another embodiment, the recursive DNS server 110 may send the message to a router. When a recursive DNS server that already has the whitelist entry receives the message, the recursive DNS server may not send the message to its neighboring recursive DNS servers. When a recursive DNS server receives the message from one of its neighboring recursive DNS servers, the recursive DNS server updates its whitelist table such that subsequent queries for the whitelisted domain from the whitelisted source IP address or customer identifier are responded to with the correct (e.g., whitelisted) answer.

In addition to sending the me sage to one or more other recursive DNS servers, the recursive DNS server 110 may also send a response for each of the queries back to the browser's cache, thereby filling the browser cache with entries consisting of these DNS responses, as at step 970.

At this point, the JavaScript on the user's browser waits a predetermined amount of time, such as 1 or 5 seconds, before requesting to reload the web site. Then, at step 975, the browser may send a request for the (blacklisted) web site www.example.com. At step 980, the blacklisted web site may be added to the whitelist stored on the recursive DNS server 110. Because this web site is now whitelisted, the recursive DNS server 110 may send the real IP address corresponding to www.example.com to the user's browser, as at step 985. The user is then able to access the web site, without receiving a block page, for the time period of N or 2*N. Thus, the expiration of the whitelist may happen in the same manner as described with respect to FIG. 2 above.

Disclosed embodiments include computer systems having a processor and computer-readable storage media that include code for instructions to perform disclosed processes. Disclosed embodiments can include various types of computer-readable memory or storage device, such as a random access memory, a read-only memory, a mass storage device such as a hard disk, a CD, a DVD, and the like. Disclosed embodiments can include monitors, track balls, mice, keyboards, and the like. Disclosed embodiments can be connected to computers, cell phones, and other systems using a network. Various computers and systems can exchange information among the network. Disclosed embodiments can be deployed on any operation system or platform such as Linux based operating systems.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method, performed by a processor, for automatically adding a blacklisted site to a whitelist in response to a user's request, comprising:
   generating, via a web browser, at least one whitelisting query for whitelisting an encoded domain, the encoded domain being a sequence in a first tag format that includes a hash and a static domain, wherein the hash is a cryptographic hash of:
   (i) an IP address of a user,
   (ii) a normalized timestamp, and
   (iii) a blocked domain, and
   wherein the static domain is a constant domain representing the at least one whitelisting query; and
   sending, via the web browser, the at least one whitelisting query to a first recursive DNS server,
   wherein the first recursive DNS server is configured to create a message comprising whitelist information, and
   wherein the first recursive DNS server is configured to send the message to a second server.

2. The method of claim 1, wherein the first tag format includes a nonce that comprises a unique identifier for the at least one whitelisting query, and wherein the whitelist information comprises the IP address of the user, a user identifier, the blacklisted site, a timestamp, or a combination thereof.

3. The method of claim 1, wherein sending the message from the first recursive DNS server to the second server comprises:
sending the message to a centralized distribution point; and
sending the message from the centralized distribution point to the second server.

4. The method of claim 1, further comprising sending the message from the second server to a third server.

5. The method of claim 1, wherein the second server comprises a recursive DNS server.

6. The method of claim 1, further comprising:
requesting, via the web browser over a network, the blacklisted site, the blacklisted site having a domain name of a second tag format <blocked-domain>;
sending at least one response based on the at least one whitelisting query to a cache of the web browser;
receiving a request from the web browser for the blacklisted site; and
adding the blacklisted site to the whitelist stored on the first recursive DNS server, the second server, or both.

7. The method of claim 6, further comprising sending to the web browser an IP address of a first block page, the first block page including at least one of:
instructions;
a description of the blacklisted site; or
a selectable item.

8. The method of claim 1, wherein the hash expires after a certain time period past the normalized timestamp.

9. A system for adding a blacklisted site to a whitelist comprising:
a processor; and
a memory containing executable code, that when executed by the processor, causes the processor to perform a method comprising:
requesting, via a web browser over a network, the blacklisted site, the blacklisted site having a domain name of a tag format <blocked-domain>;
generating, via the web browser, at least one whitelisting query for whitelisting an encoded domain, the encoded domain being a sequence in a first tag format that includes a hash and a static domain, wherein the hash is a cryptographic hash of:
(i) an IP address of a user,
(ii) a normalized timestamp, and
(iii) a blocked domain, and
wherein the static domain is a constant domain representing the at least one whitelisting query; and
sending, via the web browser, the at least one whitelisting query to a first recursive DNS server,
wherein the first recursive DNS server is configured to create a message comprising whitelist information, and
wherein the first recursive DNS server is configured to send the message to a second recursive DNS server.

10. The system of claim 9, wherein the tag format includes a nonce that comprises a unique identifier for the at least one whitelisting query, and wherein the whitelist information comprises the IP address of the user, a user identifier, the blacklisted site, a timestamp, or a combination thereof.

11. The system of claim 9, wherein the first recursive DNS server is configured to send the message to the second recursive DNS server by sending the message to a centralized distribution point.

12. The system of claim 11, the method further comprising sending the message from the centralized distribution point to the second recursive DNS server.

13. The system of claim 9, the method further comprising sending the message from the second recursive DNS server to a third recursive DNS server.

14. The system of claim 9, the method further comprising:
sending at least one response based on the at least one whitelisting query to a cache of the web browser;
receiving a request from the web browser for the blacklisted site; and
adding the blacklisted site to the whitelist stored on the first recursive DNS server, the second recursive DNS server, or both.

15. The system of claim 9, the method further comprising sending to the web browser an IP address of a first block page, the first block page including at least one of:
instructions;
a description of the blacklisted site; or
a selectable item.

16. A computer-implemented method, performed by a processor, for automatically adding a blacklisted site to a whitelist in response to a user's request, comprising:
receiving, at a first recursive DNS server, at least one whitelisting query for whitelisting an encoded domain, the encoded domain being a sequence in a first tag format that includes a hash and a static domain, wherein the hash is a cryptographic hash of:
(i) an IP address of a user,
(ii) a normalized timestamp, and
(iii) a blocked domain, and
wherein the static domain is a constant domain representing the at least one whitelisting query; and
creating, via the first recursive DNS server, a message comprising whitelist information; and
sending the message from the first recursive DNS server to a second server.

17. The method of claim 16, wherein the first tag format includes a nonce that comprises a unique identifier for the at least one whitelisting query, and wherein the whitelist information comprises the IP address of the user, a user identifier, the blacklisted site, a timestamp, or a combination thereof.

18. The method of claim 16, wherein sending the message from the first recursive DNS server to the second server comprises:
sending the message to a centralized distribution point; and
sending the message from the centralized distribution point to the second server.

19. The method of claim 16, further comprising sending the message from the second server to a third server.

20. The method of claim 16, wherein the second server comprises a recursive DNS server.

21. The method of claim 16, further comprising:
requesting, via a web browser over a network, the blacklisted site, the blacklisted site having a domain name of a second tag format <blocked-domain>;
sending at least one response based on the at least one whitelisting query to a cache of the web browser;
receiving a request from the web browser for the blacklisted site; and
adding the blacklisted site to the whitelist stored on the first recursive DNS server, the second server, or both.

22. The method of claim 16, further comprising validating the hash to determine that the blocked domain is approved to be added to the whitelist.

* * * * *